(12) United States Patent
Harrison et al.

(10) Patent No.: US 10,707,775 B2
(45) Date of Patent: Jul. 7, 2020

(54) METHOD AND APPARATUS FOR MULTI PHASE SHIFT POWER CONVERTER CONTROL

(71) Applicant: Enphase Energy, Inc., Petaluma, CA (US)

(72) Inventors: Michael J. Harrison, Petaluma, CA (US); Donald Richard Zimmanck, Petaluma, CA (US); Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 226 days.

(21) Appl. No.: 14/450,699

(22) Filed: Aug. 4, 2014

(65) Prior Publication Data
US 2015/0049518 A1    Feb. 19, 2015

Related U.S. Application Data

(60) Provisional application No. 61/865,827, filed on Aug. 14, 2013.

(51) Int. Cl.
*H02M 3/335* (2006.01)
*H02M 7/48* (2007.01)
*H02M 7/5387* (2007.01)

(52) U.S. Cl.
CPC ...... *H02M 7/4807* (2013.01); *H02M 7/53873* (2013.01); *H02M 2007/4815* (2013.01); *Y02B 70/1441* (2013.01)

(58) Field of Classification Search
CPC .......... H02M 7/4807; H02M 7/53873; H02M 2007/4815; Y02B 70/1441

USPC ............................... 363/17, 21.02, 131, 132
See application file for complete search history.

(56) References Cited

U.S. PATENT DOCUMENTS

| | | |
|---|---|---|
| 4,694,383 A | 9/1987 | Nguyen et al. |
| 5,027,264 A | 6/1991 | DeDoncker et al. |
| 5,550,498 A | 8/1996 | Kwan et al. |
| 6,351,401 B1 | 2/2002 | Scheel et al. |
| 6,574,125 B2 | 6/2003 | Matsukawa et al. |
| 8,587,975 B2 | 11/2013 | Jain et al. |

(Continued)

OTHER PUBLICATIONS

M. Kim et al., "A Dual-Phase-Shift Control Strategy for Dual-Active-Bridge DC-DC Converter in Wide Voltage Range", 8th International Conference on Power Electronics—ECCE Asia, May 30-Jun. 3, 2011, The Shilla Jeju, Korea, pp. 364-371.

(Continued)

*Primary Examiner* — Daniel Kessie
*Assistant Examiner* — Monica Mata
(74) *Attorney, Agent, or Firm* — Moser Taboada

(57) ABSTRACT

A method and apparatus for multi phase shift control of a power converter. In one embodiment, the method comprises controlling a phase shift between a left leg and a right leg of a first bridge of the power converter during operation of the power converter; and controlling a phase shift between the first bridge and a second bridge of the power converter during the operation of the power converter, wherein the phase shift between the left and the right legs and the phase shift between the first and the second bridges are controlled based on an input voltage of the power converter and a required output voltage of the power converter.

17 Claims, 4 Drawing Sheets

(56) References Cited

U.S. PATENT DOCUMENTS

| 8,638,581 B2 | 1/2014 | Zacharias et al. | |
|---|---|---|---|
| 2008/0013351 A1* | 1/2008 | Alexander | H02M 3/1582 363/123 |
| 2012/0014138 A1* | 1/2012 | Ngo | H02M 3/33584 363/17 |

OTHER PUBLICATIONS

International Search Report and Written Opinion dated Nov. 19, 2014 for Application No. PCT/US2014/049679, 12 pgs.

Pinheiro et al., "Zero Voltage Switching Series Resonant Based", Dept. of Elec. & Comp. Eng., Concordia University, Canada, pp. 549-552, 1988.

Norrga, "A Novel Soft-switched Bidirectional Isolated AC/DC Converter", Royal Inst. of Technology, Electric Machines and Power Electronics, Sweden, 2002.

Kim et al., "A Dual-Phase-Shift Control Strategy for Dual-Active-Bridge DC-DC Converter in Wide Voltage Range", 8th International Conference on Power Electronics—ECCE Asia, The Shilla Jeju, Korea, pp. 364-371, May 30-Jun. 3, 2011.

Krishnaswami, "Photovoltaic Microinverter using Single-stage Isolated High-frequency link Series Resonant Topology", Department of Electrical and Computer Engineering, the University of Texas, San Antonio, Texas, USA, pp. 495-500, 2011.

Jauch et al., "Single-Phase Single-Stage Bidirectional Isolated ZVS AC-DC Converter with PFC", 15th International Power Electronics and Motion Control Conference, EPE-PEMC 2012 ECCE Europe, Novi Sad, Serbia, 2012.

Twiname et al., "A Resonant Bi-Directional DC-DC Converter", pp. 3890-3894, 2012.

Nayanasiri et al., "Half-Wave Cycloconverter-Based Photovoltaic Microinverter Topology With Phase-Shift Power Modulation", IEEE Transactions on Power Electronics, vol. 28, Issue 6, pp. 2700-2710, Jun. 2013.

\* cited by examiner

US 10,707,775 B2

METHOD AND APPARATUS FOR MULTI PHASE SHIFT POWER CONVERTER CONTROL

CROSS-REFERENCE TO RELATED APPLICATIONS

This application claims benefit of U.S. provisional patent application Ser. No. 61/865,827, filed Aug. 14, 2013, which is herein incorporated in its entirety by reference.

BACKGROUND OF THE INVENTION

Field of the Invention

Embodiments of the present disclosure relate generally to power conversion, and, in particular, to operating a power converter using multiple phase shifts with respect to multiple bridges.

Description of the Related Art

Power converters such as DC-DC converters and DC-AC inverters are employed in a wide variety of applications for converting an input power to a different output power. Traditional control techniques for such power converters operate based on a single control parameter, such as phase shift control used in phase-shifted full bridge (PSFB) converters and dual active bridge (DAB) converters. While a single control parameter allows for a simple control design, it does not allow for optimum control over a wide range of operating conditions.

Therefore, there is a need in the art for a method and apparatus for efficiently controlling the output power of a resonant converter.

SUMMARY OF THE INVENTION

Embodiments of the present invention generally relate to using multiple phase shifts with respect to bridges to control power conversion substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
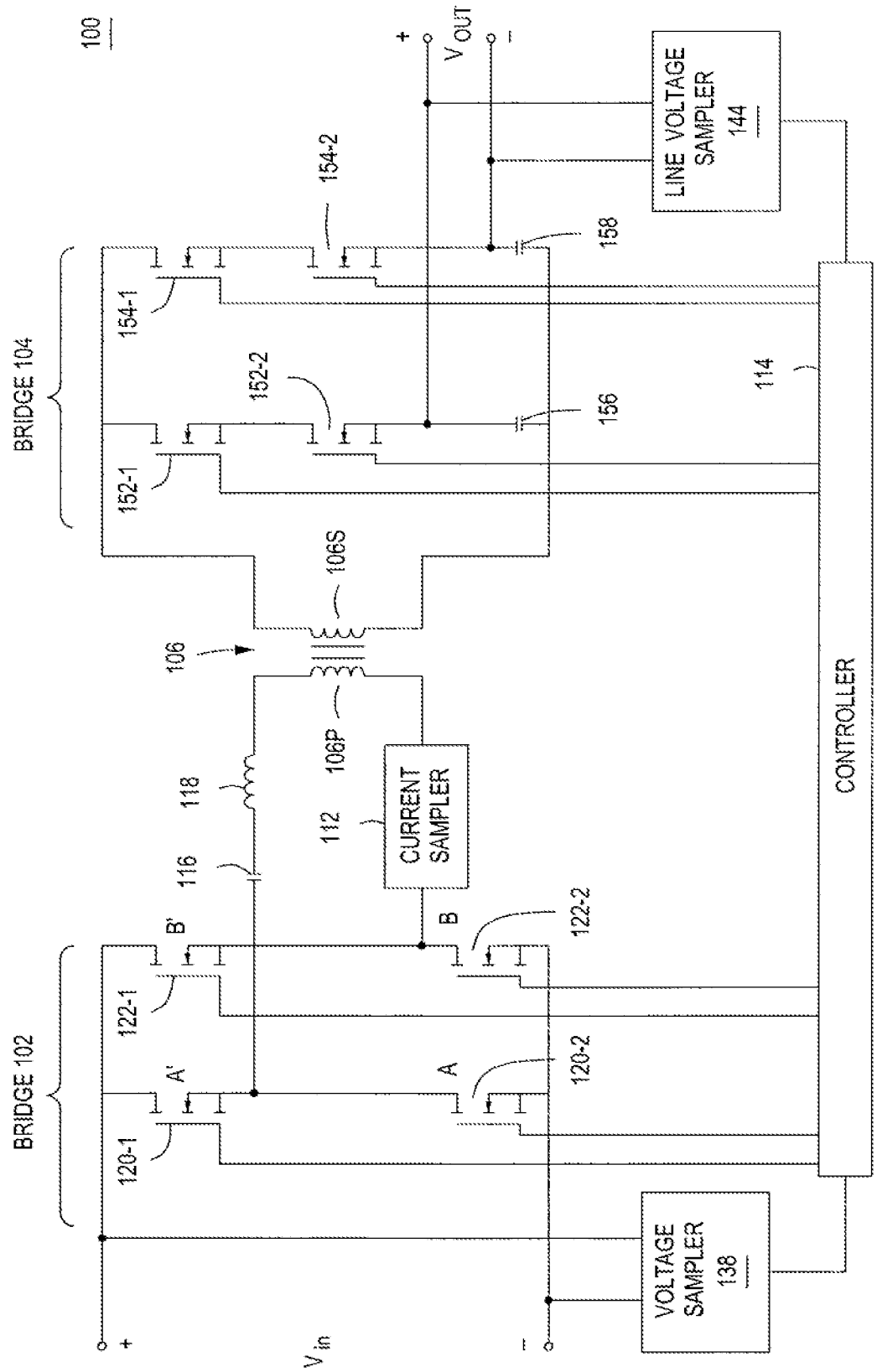
FIG. 1 is a block diagram of a switched mode resonant converter in accordance with one or more embodiments of the present invention.

FIG. 1 is a block diagram of a switched mode resonant converter 100 (resonant converter 100) in accordance with one or more embodiments of the present invention. This diagram only portrays one variation of the myriad of possible system configurations. The present invention can function in a variety of power generation environments and systems.

The resonant converter 100 comprises a bridge 102 and a series combination of a capacitor 116, an inductor 118, a primary winding 106P of a transformer 106, and a current sampler 112. Such components form a DC voltage switching stage of the resonant converter 100. The bridge 102 is a full H-bridge comprising switches 120-1, 120-2, 122-1, and 122-2 (e.g., n-type metal-oxide-semiconductor field-effect transistors, or MOSFETs) arranged such that switches 120-1/120-2 and 122-1/122-2 form first and second legs (i.e., left and right legs), respectively, of the H-bridge. Gate and source terminals of each of the switches 120-1, 120-2, 122-1, and 122-2 are coupled to a controller 114 for operatively controlling the switches. In other embodiments, the switches 120-1, 120-2, 122-1, and 122-2 may be any other suitable electronic switch, such as insulated gate bipolar transistors (IGBTs), bipolar junction transistors (BJTs), p-type MOSFETs, gate turnoff thyristors (GTOs), and the like. The bridge is able to switch, for example, from 60 to 600 volts depending upon the DC voltage source to the bridge.

A first output terminal of the bridge 102 is coupled between the switches 120-1 and 120-2, and is also coupled to a first terminal of the capacitor 116. A second terminal of the capacitor 116 is coupled to a first terminal of the inductor 118, and a second terminal of the inductor 118 is coupled to a first terminal of the primary winding 106. The capacitor 116 and the inductor 118 form a series resonant circuit having a frequency of, for example, 100 kilohertz (kHz), although the resonant circuit may have a different resonant frequency. In some alternative embodiments, the inductor 118 may represent a leakage inductance of the transformer 106 rather than being a separate inductor, thereby reducing the overall component count of the resonant converter 100. In other alternative embodiments, other types of resonant circuits (e.g., parallel LC, series-parallel LLC, series-parallel LCC, series-parallel LLCC, and the like) may be utilized within the resonant converter 100.

The current sampler 112 is coupled between a second terminal of the primary winding 106P and a second output terminal of the bridge 102 that is coupled between the switches 122-1 and 122-2. Additionally, a voltage sampler 138 is coupled across the input to the bridge 102; both the voltage sampler 138 and the current sampler 112 are coupled to the controller 114. The current sampler 112 samples the current through the primary winding 106P and generates values indicative of the sampled current ("current samples"), while the voltage sampler 138 samples the voltage across the bridge 102 and generates values indicative of the sampled primary side voltage ("primary voltage samples"). The current sampler 112 and the voltage sampler 138 may perform such sampling at rates of, for example, 50 MHz for a switching frequency of 100 kHz. In some embodiments, the current sampler 112 and the voltage sampler 138 each comprise an analog-to-digital converter (ADC) for generating the samples in a digital format. The current sampler 112 and the voltage sampler 138 respectively couple the current and primary voltage samples to the controller 114 for use in operatively controlling the resonant converter 100.

On the secondary side of the transformer 106, a bridge 104 (i.e., an AC half-bridge that is a cycloconverter) is coupled across a secondary winding 106S. The bridge 104 comprises switches 152-1, 152-2, 154-1, and 154-2 (e.g., MOSFETs or other suitable electronic switches) and capacitors 156 and 158; gate and source terminals of each of the switches 152-1, 152-2, 154-1, and 154-2 are coupled to the controller 114 for operatively controlling the switches. The switches 152-1 and 152-2 and capacitor 156 are coupled in series and respectively coupled in parallel to a series combination of the two other switches 154-1 and 154-2 and capacitor 158. The bridge 104 couples an AC output power to first and second output terminals coupled between the respective pairs of switches and capacitors. A line voltage sampler 144 is coupled across the first and second output terminals for sampling the AC line voltage and provides line voltage samples to the controller 114 for use in operatively controlling the resonant converter 100. In some embodiments, the line voltage sampler 144 comprises an ADC for generating the samples in a digital format.

In certain embodiments, the capacitor 116 may be on the order of 500 nanofarad (nF), the inductor 118 may be on the order of 5 microhenries (pH), the capacitors 156 and 158 may be on the order of 1,000 nF, and the transformer 106 may have a turns ratio of 1:6 such embodiments may have a frequency range of 100 kilohertz (kHz)-500 kHz.

In some alternative embodiments, the bridge 104 may be a three-phase cycloconverter for coupling three-phase or split-phase AC output to an AC line, such as a commercial power grid.

During operation, the bridge 102 receives an input voltage Vin from a DC voltage source, such as one or more renewable energy sources (e.g., photovoltaic (PV) modules, wind farms, hydroelectric systems, or the like), batteries, or any suitable source of DC power. The controller 114 switches the left and right legs of the bridge 102 with a phase shift between the legs to generate a bridge output voltage that is a bipolar square wave. The switches 120-2, 120-1, 122-2 and 122-1 of the bridge 102 are driven by control signals A, A' (where A' is the complement of A), B, and B' (where B' is the complement of B), respectively. Each of the control signals A, A', B, and B' have the same frequency and have a 50% duty cycle. Dead times are assumed to prevent shoot-through.

The bridge output voltage results in a current through the resonant circuit and the primary winding 106P, thereby inducing an alternating current in the secondary winding 106S. The transformer 106 may be a step-up transformer for increasing the voltage from the primary to the secondary (for example, for a DC input generated by a PV module, the transformer 106 would be a step-up transformer) or, alternatively, a step-down transformer for decreasing the voltage.

As a result of the current induced in the secondary winding 106S, an approximately sinusoidal current waveform flows into the bridge 104. The amplitude of the current waveform is controlled by the switching frequency of the bridge 102 and can be increased or decreased by suitably adjusting the switching frequency of the H-bridge; i.e., the current (and power) transferred varies as the signal frequency moves away from the resonant frequency of the resonant circuit. The bridge 104 converts the received AC power from the secondary winding 106S to an AC output power of a different frequency and couples the AC output power to the first and second output terminals.

In accordance with one or more embodiments of the present invention, power conversion through the resonant converter 100 is controlled by controlling a phase shift within the bridge 102 between the right and left hand legs in the same way as normally implemented for the Phase Shifted Full Bridge (PSFB) converter (i.e., a phase shift between switch pairs 120-1/120-2 and 122-1/122-2) as well as a phase shift between the bridge 102 and the bridge 104 in the same way as normally implemented for the Dual Active Bridge (DAB) converter. By using such a multi phase shift control technique, additional degrees of control freedom are created, including variable effective frequency control and asymmetric duty cycle control. The additional degrees of control freedom presented by the multi phase shift control technique may then be constrained to always result in the optimum operational regime for any operating condition; i.e., the most efficient switching regime can be achieved over all possible operational points. In particular, a DC-AC converter such as the resonant converter 100 must cover a wide output voltage range as it transitions between a peak value (such as a peak mains voltage) down to zero. The additional degrees of control freedom provided by the multi phase shift control technique provide the advantage of enabling the DC-AC converter to achieve optimum control over such a wide output voltage range.

The multi phase shift control technique always achieves zero voltage and zero current switching (ZVZCS) for one bridge leg transition and zero voltage switching (ZVS) for the other transition and is able to extend operation from full power down to zero power. Additionally, this control technique reduces the switching frequency range compared to conventional variable frequency control schemes (thus reducing gate switching losses), and allows the resonant converter 100 (or other converters in other embodiments) to be operated closer to the resonant frequency under all conditions, thus allowing the use of a smaller resonant tank while also reducing the converter currents to an absolute minimum possible. The ability to operate the converter (e.g., the resonant converter 100) closer to the resonant frequency and the reduction of the switching frequency variation allows the effective minimum frequency of the converter to be increased (with respect to the "average" switching frequency), thus allowing the converter to be designed to utilize smaller magnetic components.

The multi phase shift control technique described herein may be extended to any power converter having a minimum of two active bridges, where at least one of the bridges is a full bridge comprising four switches (i.e., at least one of the bridges must be a full bridge, such as the bridge 102, in order to enable a phase shift within that bridge). For example, the multi phase shift control technique may be employed for multiple port converters (i.e., having more than two bridges) and converters having two (or more) full bridges. In those embodiments where the converter comprises two or more full bridges, there are respectively more degrees of freedom in regard to the phase shifts that can occur. For example, for a dual full bridge converter the input bridge can have a phase shift applied and independently the output bridge can have a different phase shift applied, while finally a third independent phase shift can be implemented between the input and output bridges. The multi phase shift control technique can be further extended to be applied to devices comprising three-phase (hex bridge) or any poly-phase active power bridge. Additionally, the multi phase shift control technique can be applied to DC switching bridges or alternately AC switching bridges (i.e., cycloconverters such as the bridge 104), for example in DC-DC converters, DC-AC converters (i.e., inverters), AC-DC converters (i.e., rectifiers) and AC-AC converters (i.e., cycloconverters), where in all embodiments the converters can be controlled to provide bi-directional power flow and in all embodiments the AC ports can be configured for single-phase, three-phase, or any other poly-phase configuration.

Figure 2:
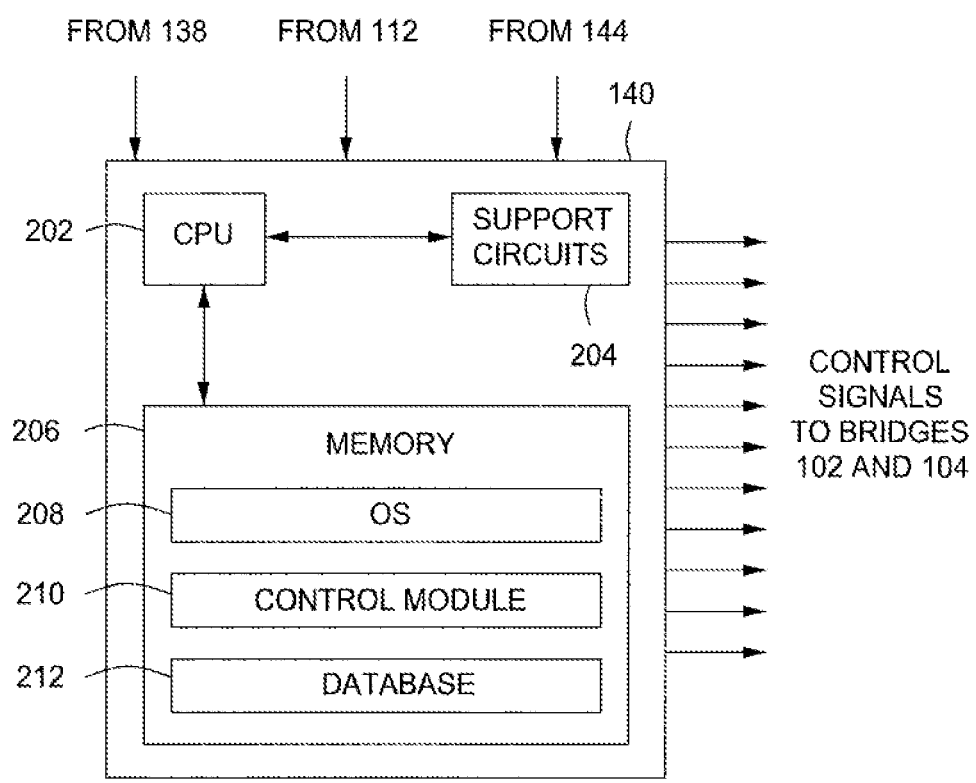
FIG. 2 is a block diagram of a controller in accordance with one or more embodiments of the present invention.

FIG. 2 is a block diagram of a controller 114 in accordance with one or more embodiments of the present invention. The controller 114 comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The controller 114 may be implemented using a general purpose computer that, when executing particular software, becomes a specific purpose computer for performing various embodiments of the present invention.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the controller 114 that can be supported by the CPU capabilities. In some embodiments, the OS 208 may be one of a number of commercially available operating systems such as, but not limited to, LINUX, Real-Time Operating System (RTOS), and the like.

The memory 206 may store various forms of application software, such as a control module 210 for controlling operation of the resonant converter 100 as described herein. For example, the controller 114 may execute the control module 210 to determine an input voltage to the bridge 102, a required output voltage from the bridge 104, a relationship between a phase shift within the bridge 102 and a phase shift between the bridges 102 and 104, and an optimum solution based on such information. The controller 114 may then operate the resonant converter 100 based on the determined optimum solution. One embodiment of the functionality provided by the controller 114 is described below with respect to FIG. 3.

The memory 206 may additionally store a database 212 for storing data related to the operation of the resonant converter 100 and/or the present invention.

In other embodiments, the CPU 202 may be a microcontroller comprising internal memory for storing controller firmware that, when executed, provides the controller functionality described below with respect to FIG. 3. In various embodiments, the control module 210 and/or the database 212, or portions thereof, may be implemented in software, firmware, hardware, or a combination thereof.

Figure 3:
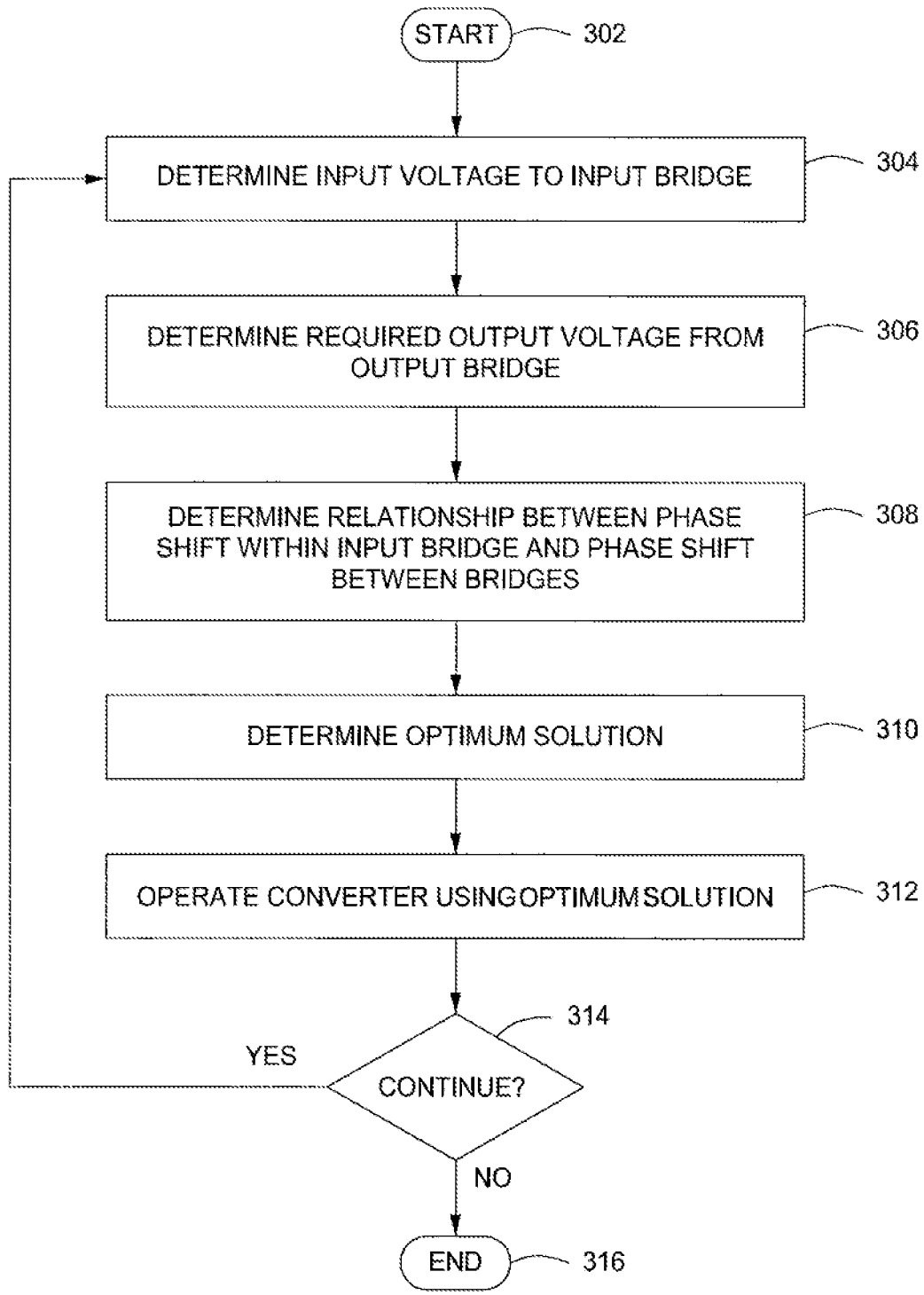
FIG. 3 is a flow diagram of a method for controlling a power converter in accordance with one or more embodiments of the present invention.

FIG. 3 is a flow diagram of a method 300 for controlling a power converter in accordance with one or more embodiments of the present invention. The method 300 is an implementation of the control module 210.

The power converter may be any power converter having a minimum of two active bridges, where at least one of the bridges is a full bridge comprising four switches. In those embodiments where the converter comprises two or more full bridges, there are respectively more degrees of freedom in regard to the phase shifts that can occur. For example, for a dual full bridge converter the input bridge can have a phase shift applied and independently the output bridge can have a different phase shift applied, while finally a third independent phase shift can be implemented between the input and output bridges.

In some embodiments, such as the embodiment described below, the power converter is a DC-AC resonant converter, such as the resonant converter 100 that comprises a full H-bridge at its input and an AC output bridge (i.e., a cycloconverter) that is a half-bridge. The resonant converter may comprise any type of resonant circuit, e.g., series LC, parallel LC, series-parallel LLC, series-parallel LCC, series-parallel LLCC, or the like. In some embodiments, the resonant converter is coupled to one or more renewable energy sources, such as PV modules, wind farms, hydro-electric systems, or the like, for receiving a DC input voltage. Additionally or alternatively, the resonant converter may be coupled to one or more other sources of DC power, such as a battery, and the energy generated by the resonant converter may be used by one or more appliances, coupled to an AC line such as a commercial AC power grid, and/or may be stored for later use, for example, utilizing batteries, heated water, hydro pumping, $H_2O$-to-hydrogen conversion, or the like.

In one or more alternative embodiments, the resonant converter may comprise a three-phase cycloconverter for coupling three-phase or split-phase AC output to an AC line.

The method 300 begins at step 302 and proceeds to step 304. At step 304, an input voltage to the input bridge of the resonant converter is determined. At step 306, a required output voltage from the resonant converter (i.e., a required output voltage from the AC output bridge) is determined. The method 300 proceeds to step 308, where a relationship between a phase shift within the input bridge and a phase shift between the input bridge and the AC output bridge is determined. At step 310, an optimum solution is determined based on the phase shift relationship determined at step 308. The method proceeds to step 312, where the resonant converter is operated using the optimum solution. Based on the determined optimum solution, a first phase shift between the right hand and left hand legs of the input bridge is implemented as well as a second phase between the input bridge and the output bridge. At step 314, a determination is made whether to continue operating the resonant converter. If the result of the determination is yes, to continue operating the resonant converter, the method 300 returns to step 304. If at step 314 the result of the determination is no, the method 300 proceeds to step 316 where it ends.

Figure 4:
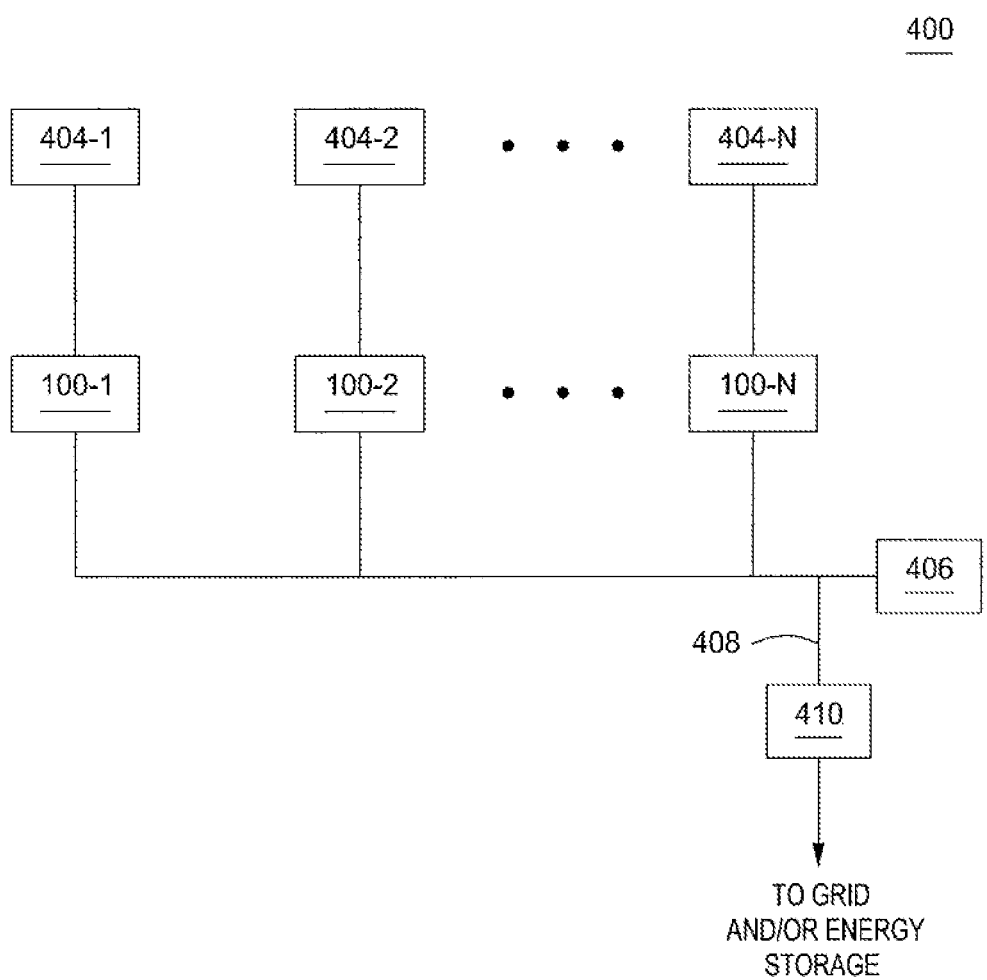
FIG. 4 is a block diagram of a system for power conversion using one or more embodiments of the present invention.

FIG. 4 is a block diagram of a system 400 for power conversion using one or more embodiments of the present invention. This diagram only portrays one variation of the myriad of possible system configurations and devices that may utilize the present invention. The present invention can be utilized in any system or device with a power converter having a minimum of two active bridges, where at least one of the bridges is a full bridge comprising four switches, such as a DC-DC converter, a DC-AC converter, an AC-AC converter, or an AC-DC converter.

The system 400 comprises a plurality of power converters 100-1, 100-2, . . . 100-N, collectively referred to as power converters 100; a plurality of DC power sources 404-1, 404-2, 404-3 . . . 404-N, collectively referred to as DC power sources 404; a controller 406; a bus 408; and a load center 410. The DC power sources 404 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 100-1, 100-2, . . . 100-N is coupled to a DC power source 404-1, 404-2 . . . 404-N, respectively, in a one-to-one correspondence; in some alternative embodiments, multiple DC power sources 404 may be coupled to a single power converter 100. The power converters 100 are coupled to the controller 406 via the bus 408. The controller 406 is capable of communicating with the power converters 100 by wireless and/or wired communication for providing operative control of the power converters 100 and/or receiving information from the power converters 100. The power converters 100 are further coupled to the load center 410 via the bus 408.

The power converters 100 convert the DC power from the DC power sources 404 to AC output power utilizing the multi phase shift control technique previously described. The power converters 100 couple the generated output power to the load center 410 via the bus 408. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 100 convert the DC input power to AC power that is commercial power grid compliant and couple the AC power to the commercial power grid via the load center 410.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for multi phase shift control of a resonant power converter, comprising:
controlling a phase shift between a left leg and a right leg of a first bridge of the resonant power converter during operation of the resonant power converter; and
controlling a phase shift between the first bridge and a second bridge of the resonant power converter during the operation of the resonant power converter, wherein the phase shift between the left and the right legs and the phase shift between the first and the second bridges are controlled based on an input voltage of the resonant power converter and a required output voltage of the resonant power converter, and wherein the first bridge is a DC-DC switching bridge and the second bridge is a cycloconverter that provides AC output power, via an AC power terminal, from the resonant power converter when the resonant power converter operates as a DC-AC inverter, and wherein the second bridge comprises a first leg coupled in parallel with a second lea, the first leg comprising a first switch coupled in series with a second switch that is coupled in series with a first capacitor, the second leg comprising a third switch coupled in series with a fourth switch that is coupled in series with a second capacitor, and wherein (i) a first node of the AC power terminal is coupled between the second switch and the first capacitor, and (ii) a second node of the AC power terminal is coupled is coupled between the fourth switch and the second capacitor.

2. The method of claim 1, further comprising:
determining a relationship between (a) the phase shift between the left and the right legs and (b) the phase shift between the first and the second bridges; and
operating the resonant power converter at an optimum operating point based on the relationship.

3. The method of claim 1, wherein the second bridge generates a single-phase output.

4. The method of claim 1, wherein the second bridge generates a three-phase output.

5. The method of claim 1, wherein the resonant power converter is a bi-directional power converter.

6. An apparatus for power conversion using multi phase shift control, comprising:
a resonant power converter comprising:
a first bridge having a left leg and a right leg;
a second bridge; and
a controller for (i) controlling a phase shift between the left leg and the right leg of the first bridge during operation of the resonant power converter, and (ii) controlling a phase shift between the first bridge and the second bridge during the operation of the resonant power converter, wherein the phase shift between the left and the right legs and the phase shift between the first and the second bridges are controlled based on an input voltage of the resonant power converter and a required output voltage of the resonant power converter, and wherein the first bridge is a DC-DC switching bridge and the second bridge is a cycloconverter that provides AC output power, via an AC power terminal, from the resonant power converter when the resonant power converter operates as a DC-AC inverter, and wherein the second bridge comprises a first leg coupled in parallel with a second leg, the first leg comprising a first switch coupled in series with a second switch that is coupled in series with a first capacitor, the second leg comprising a third switch coupled in series with a fourth switch that is coupled in series with a second capacitor, and wherein (i) a first node of the AC power terminal is coupled between the second switch and the first capacitor, and (ii) a second node of the AC power terminal is coupled is coupled between the fourth switch and the second capacitor.

7. The apparatus of claim 6, wherein the controller further (iii) determines a relationship between (a) the phase shift between the left and the right legs and (b) the phase shift between the first and the second bridges, and (iv) operates the resonant power converter at an optimum operating point based on the relationship.

8. The apparatus of claim 6, wherein the second bridge generates a single-phase output.

9. The apparatus of claim 6, wherein the second bridge generates a three-phase output.

10. The apparatus of claim 6, wherein the resonant power converter is a bi-directional power converter.

11. A system for power conversion using multi phase shift control, comprising:
a DC source; and
a resonant power converter, coupled to the DC source, comprising:
a first bridge having a left leg and a right leg;
a second bridge; and
a controller for (i) controlling a phase shift between the left leg and the right leg of the first bridge during operation of the resonant power converter, and (ii) controlling a phase shift between the first bridge and the second bridge during the operation of the resonant power converter, wherein the phase shift between the left and the right legs and the phase shift between the first and the second bridges are controlled based on an input voltage of the resonant power converter and a required output voltage of the resonant power converter, and wherein the first bridge is a DC-DC switching bridge and the second bridge is a cycloconverter that provides AC output power, via an AC power terminal, from the resonant power converter when the resonant power converter operates as a DC-AC inverter, and wherein the second bridge comprises a first leg coupled in parallel with a second leg, the first leg comprising a first switch coupled in series with a second switch that is coupled in series with a first capacitor, the second leg comprising a third switch coupled in series with a fourth switch that is coupled in series with a second capacitor, and wherein (i) a first node of the AC power terminal is coupled between the second switch and the first capacitor, and (ii) a second node of the AC power terminal is coupled between the fourth switch and the second capacitor.

12. The system of claim 11, wherein the controller further (iii) determines a relationship between (a) the phase shift between the left and the right legs and (b) the phase shift between the first and the second bridges, and (iv) operates the resonant power converter at an optimum operating point based on the relationship.

13. The system of claim 11, wherein the second bridge generates a single-phase output.

14. The system of claim 11, wherein the second bridge generates a three-phase output.

15. The system of claim 11, wherein the DC source is a photovoltaic (PV) module.

16. The system of claim 11, wherein the DC source is a battery.

17. The system of claim 11, wherein the resonant power converter is a bi-directional power converter.

* * * * *